(12) United States Patent
Park et al.

(10) Patent No.: US 11,624,834 B2
(45) Date of Patent: Apr. 11, 2023

(54) TIME OF FLIGHT SENSING SYSTEM AND IMAGE SENSOR USED THEREIN

(71) Applicant: SK hynix Inc., Gyeonggi-do (KR)

(72) Inventors: Yujin Park, Gyeonggi-do (KR); Sungwook Seo, Gyeonggi-do (KR); Jeongeun Song, Gyeonggi-do (KR); Jinuk Jeon, Gyeonggi-do (KR); Ohjun Kwon, Gyeonggi-do (KR); Hansang Kim, Gyeonggi-do (KR); Kangbong Seo, Gyeonggi-do (KR); Minseok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 409 days.

(21) Appl. No.: 16/890,132

(22) Filed: Jun. 2, 2020

(65) Prior Publication Data

US 2021/0173085 A1 Jun. 10, 2021

(30) Foreign Application Priority Data

Dec. 9, 2019 (KR) .......................... 10-2019-0162727

(51) Int. Cl.
| | |
|---|---|
| *G01C 3/08* | (2006.01) |
| *G01S 17/894* | (2020.01) |
| *G01S 17/34* | (2020.01) |
| *G01S 7/4863* | (2020.01) |
| *G01S 7/48* | (2006.01) |

(52) U.S. Cl.
CPC .............. *G01S 17/894* (2020.01); *G01S 7/48* (2013.01); *G01S 7/4863* (2013.01); *G01S 17/34* (2020.01)

(58) Field of Classification Search
None
See application file for complete search history.

(56) References Cited

U.S. PATENT DOCUMENTS

| | | | |
|---|---|---|---|
| 8,648,998 B2 | 2/2014 | Van Nieuwenhove et al. | |
| 10,027,910 B2 | 7/2018 | Bulteel et al. | |
| 2014/0078381 A1 | 3/2014 | Ovsiannikov et al. | |
| 2017/0034464 A1* | 2/2017 | Dielacher | G01S 7/4863 |
| 2018/0306909 A1 | 10/2018 | Seliuchenko | |
| 2020/0304741 A1* | 9/2020 | Dielacher | H04N 5/378 |

FOREIGN PATENT DOCUMENTS

CN 106441597 A * 2/2017 .............. G01J 11/00

* cited by examiner

*Primary Examiner* — Mark Hellner
(74) *Attorney, Agent, or Firm* — IP & T Group LLP

(57) ABSTRACT

An image sensor employed in a time-of-flight (TOF) sensing system includes a pixel array including plural pixels, each pixel including at least one photo diode and each pixel generating an amount of charge corresponding to an incident light, comparing circuitry configured to compare voltage levels, each voltage level individually changed based on the amount of charge outputted from each pixel, with a reference voltage to output a comparison result, and calibration circuitry configured to adjust the voltage levels equally based on the comparison result.

18 Claims, 11 Drawing Sheets

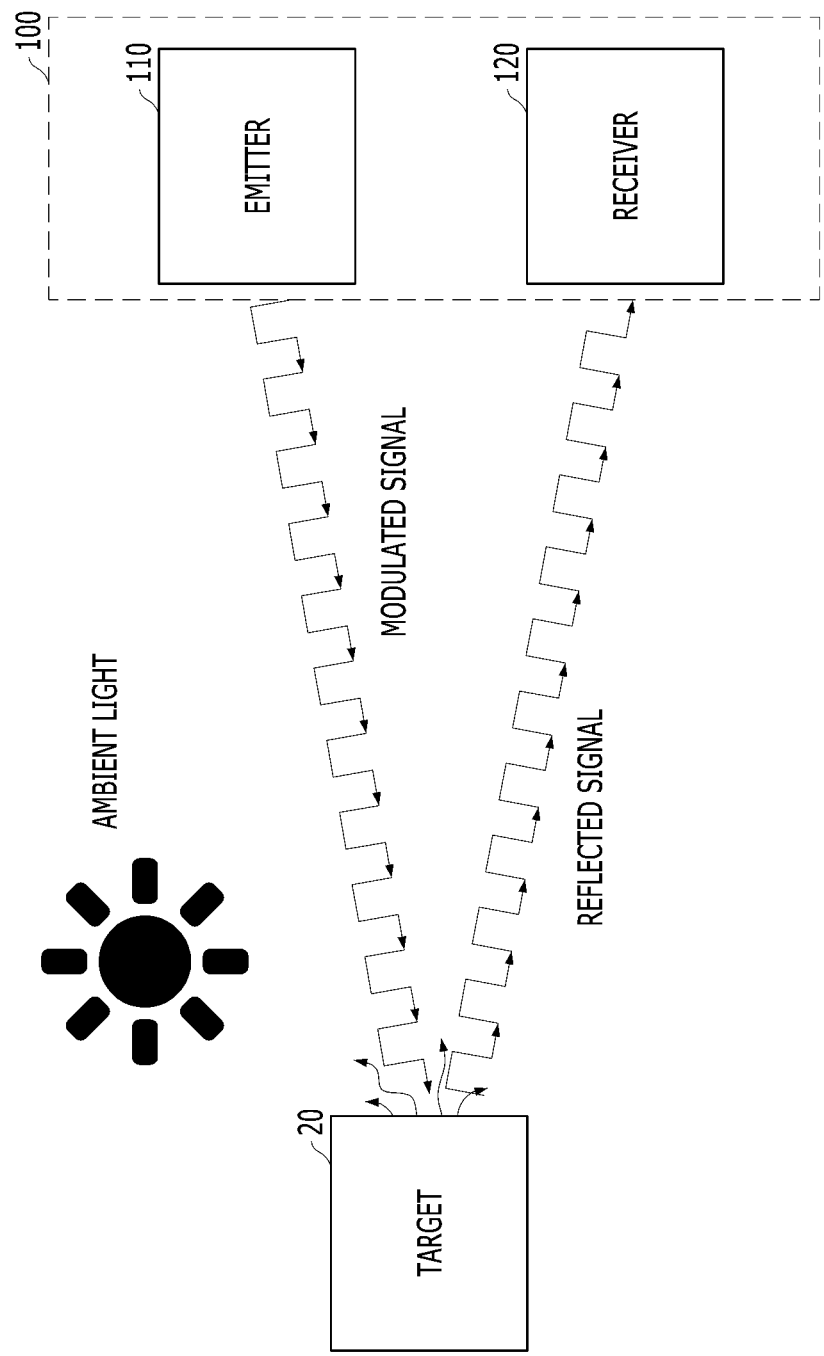

US 11,624,834 B2

TIME OF FLIGHT SENSING SYSTEM AND IMAGE SENSOR USED THEREIN

CROSS-REFERENCE TO RELATED APPLICATION

This patent application claims to the benefit of Korean Patent Application No. 10-2019-0162727, filed on Dec. 9, 2019, the entire disclosure of which is incorporated herein by reference.

TECHNICAL FIELD

An embodiment of this disclosure relates to a sensing device using a time-of-flight (TOF) system, and more particularly, to an apparatus for improving resolution or precision of the sensing device.

BACKGROUND

A time-of-flight (TOF) system calculates a distance from an origin to an object by measuring a flight time of light or a signal. Generally, the flight time is a time that the light or the signal travels from the source to the object and/or the time the light or the signal travels back from the object to the source. The origin may be a source of the light or signal such as a TOF camera using the TOF system. A TOF camera outputs an image including depth information of the object based on the distance. A conventional camera is capable of outputting a two-dimensional (2D) image representing a color and a shape of the object, but the TOF camera may output a three-dimensional (3D) image representing not only the 2D image of the object but also a depth of the object.

BRIEF DESCRIPTION OF THE DRAWINGS

The description herein makes reference to the accompanying drawings wherein like reference numerals refer to like parts throughout the figures.

FIG. 1 illustrates an operation in a time-of-flight (TOF) sensing system according to an embodiment of the disclosure.

Figure 2A:
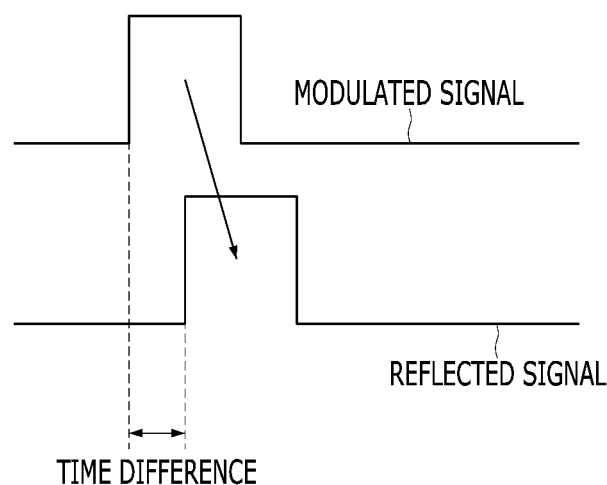
FIGS. 2A and 2B show examples of a time difference and phase difference measured between modulated and reflected signals by a TOF sensing system according to an embodiment of the disclosure.

This disclosure includes references to "one embodiment" or "an embodiment." The appearances of the phrases "in one embodiment" or "in an embodiment" do not necessarily refer to the same embodiment. Particular features, structures, or characteristics of an embodiment may be combined with any other embodiment in this disclosure in any suitable manner consistent with this disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

In this disclosure, the terms "comprise," "comprising," "include" and "including" are open-ended. As used in the appended claims, these terms specify the presence of the stated elements and do not preclude the presence or addition of one or more other elements. These terms in a claim do not foreclose the claim from including additional features (e.g., an interface unit, circuitry, etc.).

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, these terms "first," "second," "third," and so forth are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms.

These terms are used to distinguish one element from another element that otherwise have the same or similar names. For example, a first circuitry may be distinguished from a second circuitry.

Further, the term "based on" is used to describe one or more factors that affect a determination. This term does not preclude additional factors that may affect a determination. That is, a determination may be solely based on those factors or based, at least in part, on those factors. Consider the phrase "determine A based on B." While in this case, B is a factor that affects the determination of A, such a phrase does not preclude the determination of A from also being based on C. In other instances, A may be determined based solely on B.

As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

An embodiment of this disclosure can provide an apparatus for reducing an adverse effect of ambient light to obtain depth information. The apparatus can be employed in a sensing device using a time-of-flight (TOF) system. The ambient light may include available light in an environment or light that is already present in a scene, such as natural light, either outdoors or coming through windows, or artificial lights such as room lights. The apparatus can suppress saturation by the ambient light for a pixel in an image sensor while the depth information is obtained.

Further, an embodiment of the disclosure can provide an image sensor that is capable of overcoming constraints of the ambient light in an environment where the TOF system can be used. The image sensor can include the apparatus for improving utilization of a mobile device, a monitoring device, an automation device, or a computing device using the TOF system. The apparatus can provide that the TOF system can work well regardless of specific circumstance such as indoor, outdoor, night, or day.

In addition, an embodiment of the disclosure can provide an imaging device that can output a 3D image. An apparatus can reduce or avoid influence of a surrounding environment in the imaging device equipped with a TOF sensing system which can obtain depth information about an object in a scene and output a three-dimensional image including the depth information.

In an embodiment, an image sensor employed in a TOF sensing system can include a pixel array including plural pixels, each pixel including at least one photo diode and each pixel generating an amount of charge corresponding to an incident light; comparing circuitry configured to compare voltage levels, each voltage level individually changed based on the amount of charge outputted from each pixel, with a reference voltage to output a comparison result; and calibration circuitry configured to adjust the voltage levels equally based on the comparison result.

By the way of example but not limitation, the calibration circuitry is configured to maintain a difference between the voltage levels when adjusting the voltage levels by a predetermined amount.

The calibration circuitry can be further configured to supply a preset amount of current into the pixel array.

The pixel can include a reset gate, coupled to the at least one photo diode and configured to reset the amount of charge in response to a reset signal; a transfer gate configured to output a pixel voltage based on the amount of charge in response to a modulation signal; an access gate configured to be turned on in response to the pixel voltage transferred from the transfer gate; and a select gate configured to selectively output a voltage outputted from the access gate in response to a selection signal.

The calibration circuitry can be further configured to check a potential, varied based on the amount of charge, between the transfer gate and the at least one photo diode and adjust the pixel voltage between the transfer gate and the access gate.

The calibration circuitry can include a current source configured to supply a current to the pixel array for adjusting the voltage levels.

The current source can include a switching transistor which is coupled to each pixel and turned on in response to the comparison result; and a variable resistor coupled to a power supply and configured to determine an amount of the current.

The pixel array can have a structure in which the plural pixels are arranged along a plurality of rows and a plurality of columns. The calibration circuitry can control pixels row by row.

The image sensor can further include current supply circuitry configured to determine an amount of current supplied by the calibration circuitry in response to a current control signal. The current supply circuitry and the calibration circuitry works as a current mirror.

The calibration circuitry can be configured to increase the voltage levels by the predetermined amount. The predetermined amount can be proportional to the amount of current and inversely proportional to a driving frequency of each pixel.

In another embodiment, a TOF sensing system can include an emitter configured to output a modulated signal having a preset phase; a receiver including an image sensor configured to receive a reflected signal which is reflected from a target; and signal processing circuitry configured to determine a distance from the target based on a phase relationship between the modulated light and the reflected light. The image sensor can include a pixel array including plural pixels, each pixel including at least one photo diode and each pixel generating an amount of charge in response to the reflected light; comparing circuitry configured to compare voltage levels, each voltage level individually changed based on the amount of charge outputted from each pixel, with a reference voltage to output a comparison result; and calibration circuitry configured to adjust the voltage levels equally based on the comparison result.

By the way of example but not limitation, the calibration circuitry is configured to maintain a difference between the voltage levels when adjusting the voltage levels by a predetermined amount.

The calibration circuitry can be further configured to supply a preset amount of current into the pixel array.

The pixel can include a reset gate, coupled to the at least one photo diode and configured to reset the amount of charge in response to a reset signal; a transfer gate configured to a pixel voltage based on the amount of charge in response to a modulation signal; an access gate turned on in response to the pixel voltage transferred from the transfer gate; and a select gate configured to selectively output a voltage outputted from the access gate in response to a selection signal.

The calibration circuitry can be configured to check a potential, varied based on the amount of charge, between the transfer gate and the at least one photo diode, and adjust the pixel voltage between the transfer gate and the access gate.

The calibration circuitry can include a current source configured to supply a current to the pixel array for adjusting the voltage levels.

The current resource can include a switching transistor coupled to each pixel and turned on in response to the comparison result; and a variable resistor coupled to a power supply and configured to determine an amount of the current.

The plural pixels are arranged along a plurality of rows and a plurality of columns. The calibration circuitry can control pixels row by row.

The TOF sensing system can further include current supply circuitry configured to determine an amount of current supplied by the calibration circuitry in response to a current control signal. The current supply circuitry and the calibration circuitry works as a current mirror.

The calibration circuitry can increase the voltage levels by a preset level. The preset level can be proportional to the amount of current and inversely proportional to a driving frequency of each pixel. In another embodiment, an operating method of a sensing system, the operating method comprising: generating a plurality of voltages according to a reflected signal; raising levels of the voltages by a set amount for all of the levels to reach a threshold or a greater level when at least one among the levels falls below the threshold; and determining a distance between the system and a target based on a phase relationship between an original signal and the reflected signal that is represented by the raised levels. The original signal travels from the system and is reflected by the target to become the reflected signal.

In another embodiment, a noise cancelling method of an image sensor, the method comprising: generating a plurality of voltages according to an incident signal; raising levels of the voltages by a set amount for all of the levels to reach a threshold or a greater level when at least one among the levels falls below the threshold; and sensing an image related to the incident signal through the raised levels.

Specific embodiments of the disclosure are now described below with reference to the accompanying drawings, wherein like numbers reference like elements.

FIG. 1 illustrates an operation in a time-of-flight (TOF) sensing system according to an embodiment of the disclosure.

Referring to FIG. 1, a TOF sensing system 100 can measure a distance from a target 20. The TOF sensing system 100 can include an emitter 110 configured to output a modulated signal used for measuring a distance from the target 20 and a receiver 120 configured to receive a reflected signal reflected from the target 20. The modulated signal may be shot at the target 20 and considered the reflected signal after reflected from the target 20. The modulated signal and the reflected signal may have the same characteristics such as a wavelength.

The TOF sensing system 100 is considered one of very important devices for automation development in various industrial fields and consumer markets. A device used by a consumer, such as a mobile phone, a tablet, a vehicle and the like may include the TOF sensing system 100. The TOF sensing system 100 can be used to recognize a surrounding environment and/or a position of the device in the surrounding environment. For example, a camera including the TOF sensing system 100 may determine a color, a shape, and a depth (distance) of the target 20 included in a three-dimensional (3D) environment (e.g., scene or image frame) to provide a 3D vision technology for the consumer using the device.

The modulated signal outputted from the emitter 110 in the TOF sensing system 100 may have a preset pattern. The emitter 110 can shoot modulated signals to the surrounding environment. The modulated signals can be reflected from various objects in the surrounding environment. When the reflected signal is received through the receiver 120, the TOF sensing system 100 may determine a distance based on a correlation relationship between the modulated signal, which is outputted from the emitter 110, and the reflected signal which is received by the receiver 120.

In a procedure of recognizing the correlation relationship between the modulated signal and the reflected signal and determining the distance based on the correlation relationship, ambient light may disturb the TOF sensing system 100. Specifically, in order to obtain a distance (e.g., depth information) in a bright sunlight environment or to require a high resolution of the distance, an additional process may need to be performed to remove disturbance (e.g., noise) caused by the ambient light.

Figure 2B:
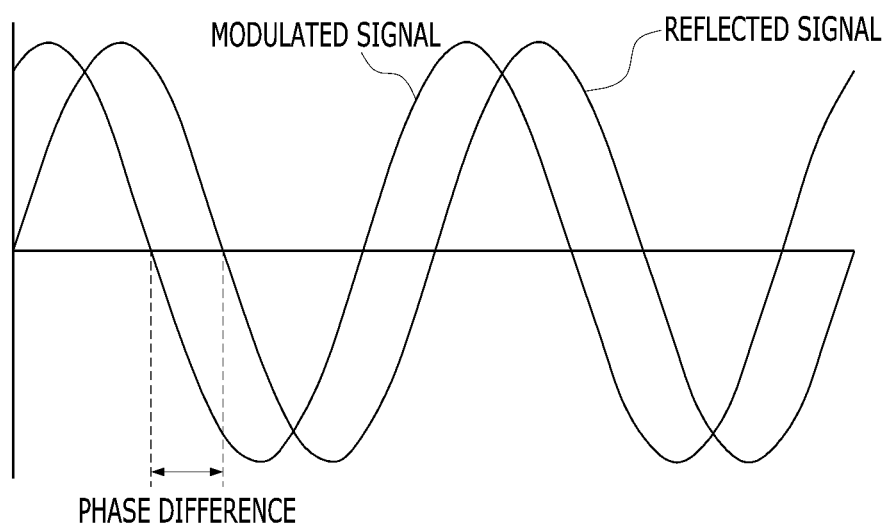

FIGS. 2A and 2B show examples of measured value in a TOF sensing system 100 according to an embodiment of the disclosure. Specifically, FIG. 2A illustrates measuring a time difference or a time delay between the modulated signal and the reflected signal. FIG. 2B measuring a phase difference or a phase delay between the modulated signal and the reflected signal.

Referring to FIG. 2A, the TOF sensing system, according to an embodiment, may measure a time difference or time delay between the modulated signal and the reflected signal. The modulated signal is outputted from the emitter 110 described with reference to FIG. 1 and reflected on the target 20. The receiver 120 may directly measure a round trip time when the reflected signal is received after the modulated signal is shot. The modulated signal may have a form of a preset pulse. The illuminance intensity of the modulated signal can be much greater than that of other background light such as the ambient light. A method for measuring the time difference or time delay may be easily applicable to a Light Detection and Ranging (LiDAR) apparatus equipped with an autonomous vehicle, because the method can be used outdoors and easy to measure a long distance from a target or an object. However, because a time-to-digital converter (TDC) is required in the TOF sensing system 100 configured to measure the time difference or time delay, the TOF sensing system 100 can be often expensive and might not be time-measured in many pixels, so that a resolution of image including depth information or distances obtained by the TOF sensing system 100 can be generally low. The TOF sensing system 100 for measuring the time difference or time delay may have been used in an expensive device used mainly for the specific purpose of a satellite, a space exploration tool, a national defense device, and the like.

Referring to FIG. 2B, the TOF sensing system 100 measures the phase difference or the phase delay between the modulated signal and the reflected signal. A distance between the TOF sensing system 100 and a target/object can be estimated through a signal processing method for measuring the phase difference or the phase delay. This method is easier than the method shown in FIG. 2A for measuring a relatively short distance within several meters, which may be mainly used indoors. Because the 3D image can be obtained through the signal processing method inside the image sensor, the size or complexity of the TOF sensing system 100 may be reduced. The TOF sensing system 100 may require a small amount of calculation, so that the TOF sensing system 100 has a high frame rate. In addition, the TOF sensing system 100 for measuring the phase difference or the phase delay can be implemented within a small space and with a low cost. However, when measuring the phase difference or the phase delay, a measurable distance may be limited. For example, because the phase difference is used to measure a distance, an object with a distance corresponding to beyond one period may not be accurate. When a period corresponds to 10 m and a phase difference is 180° (a half period), the half period may correspond to 5 m or 15 m. Further, when a phase difference is 0°, no phase difference may correspond to 10 m or 20 m. This may be referred to as an ambiguity problem.

Figure 3:
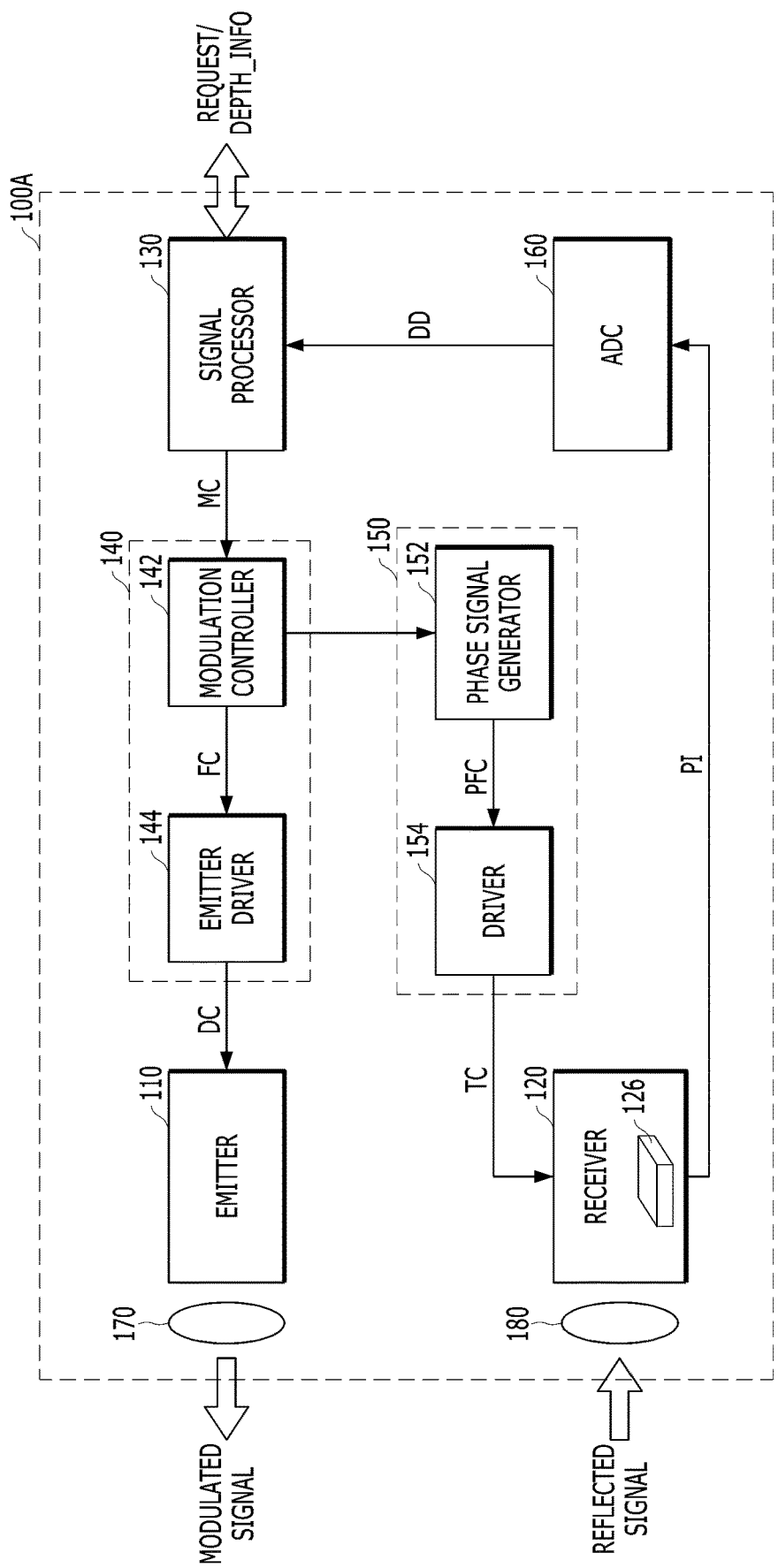
FIG. 3 illustrates a first example of a TOF sensing system according to an embodiment of the disclosure.

FIG. 3 illustrates a first example of a TOF sensing system 100 according to an embodiment of the disclosure. Specifically, FIG. 3 shows an example of a TOF sensing system 100A using a continuous wave modulation scheme. When the time of flight can be directly measured through the modulated signal and the reflected signal, a distance between a TOF sensing system and a target can be calculated based on the speed of light (e.g., light constant c). However, it is difficult to directly measure an exact time of flight of the modulated signal, and an error such as a circuit delay can occur at a process of receiving the modulated signal and analyzing the modulated signal. Herein, a TOF sensing system 100A using the continuous wave modulation scheme may measure a phase difference between the modulated signal and the reflected signal. The time-of-flight sensing system 100A can recognize a phase difference. Based on a correlation relationship between the modulated signal and the reflected signal such as the phase difference, the time-of-flight sensing system 100A can calculate a distance when a modulation frequency and the speed of modulated signal are known.

Referring to FIG. 3, the TOF sensing system 100A may include an emitter 110, a receiver 120, a signal processor 130, a modulator 140, a demodulator 150, a signal converter 160, a first lens unit 170, and a second lens unit 180.

The signal processor 130 may receive a request for distance measurement or depth information from another device or a user interface of the TOF sensing system 100A. In response to the request, the signal processor 130 may output data about the estimated distance or the depth information. The signal processor 130 may enable the modulator 140, based on the request. For example, the signal processor 130 may output a modulation control signal MC to the modulator 140 to control the operation of the modulator 140.

In response to an output of the signal processor 130, the modulator 140 may generate a modulated signal. The modulated signal may be outputted, shot or radiated through the emitter 110. According to an embodiment, the modulator 140 may include a modulation controller 142 and/or an emitter driver 144. The modulation controller 142 may output a modulation period signal FC such that the emitter 110 outputs the modulated signal that can be distinguishable from the ambient light described with reference to FIG. 1. According to an embodiment, the emitter 110 may include a light emitting device (e.g., a light emitting diode), and an emitting control signal DC outputted from the modulator 140 may be used as a signal for driving the light emitting device. According to another embodiment, the emitter driver 144 may be included in the emitter 110. The modulator 140 may control the emitter 110 so that the modulated signal generated by the transmitter 110 may have a preset frequency or a preset amplitude. The modulation controller 142 may output the modulation period signal FC having a specific frequency or a specific phase to the emitter 110.

The modulation controller 142 included in the modulator 140 may generate the modulation period signal FC for generating a modulation signal after receiving the modulation control signal MC. The modulation signal may have one of various types of signals. For example, the emitter driver 144 may use a modulation period signal FC to control a pulse outputted from a light source or a light modulation element included in the emitter 110. According to an embodiment, the modulation controller 142 may output a modulated signal such as a triangular wave (e.g., ramp waveform), a sine wave, a square wave, or the like through a light source or a light modulation element included in the transmitter 110.

On the other hand, due to a driving error and a nonlinearity of a light emitting diode (LED) or a laser diode (LD) included in the emitter 110, the emitter 110 might not output the modulated signal having an ideal waveform such as a pulse, a triangle wave, a sine wave or the like. For example, the light emitting diode (LED) may operate above a threshold current. Nonlinearity and saturation of an output optical power with respect to the input current may occur even in a driving period where a current is supplied to the light emitting diode (LED). In addition, the light emitting diode (LED) may not have a linear gain of light modulation in the driving period. Specifically, in a case of supplying a high voltage or a high current to the emitter 110, the nonlinearity or a driving error of the light emitting diode (LED) may grow worse based on a configuration or a design of driving circuit such as the emitter driver 144. This driving error may directly affect a result of distance/depth information extraction, so that the distance calculated by the TOF sensing system 100A might be not accurate. Accordingly, in an embodiment, the modulation controller 142 in the modulator 140 may include a complex additional algorithm and/or a driving circuit to compensate for the driving error.

The emitter driver 144 may output the emitting control signal DC used for driving a light source or an optical modulator included in the emitter 110. In response to the emitting control signal DC, the emitter 110 may output the modulated signal. In an embodiment, the emitter 110 may include a laser diode or the like which is capable of outputting a signal or light having a preset wavelength in response to the emitting control signal DC outputted from the modulator 140. For example, the modulated signal outputted from the emitter 110 may have a frequency belonging to an infrared or ultraviolet region, not to a region of visible light used to determine the color, shape or etc. of objects included in a three-dimensional environment. The emitter 110 may include a light emitting diode (LED) or a laser diode (LD) for generating light of a specific wavelength (e.g., near infrared of 850 nm). In FIG. 3, the emitter driver 144 is included in the modulator 140. But, according to another embodiment, the emitter driver 144 can be included in the transmitter 110 which includes the light emitting diode (LED) or the laser diode (LD). According to another embodiment, the light emitting diode (LED) or the laser diode (LD) included in the emitter 110 may be directly driven and controlled by the modulation controller 142 without the emitter driver 144.

The modulated signal outputted from the emitter 110 may be shot at the outside of the TOF sensing system 100A through the first lens unit 170. The first lens unit 170 may be implemented in various ways depending on a purpose of use, an operating environment or the like of the TOF sensing system 100A. For example, the first lens unit 170 may shoot the modulated signal at a specific position or area. Or, the first lens unit 170 may evenly distribute the modulated signal to a preset area within an image frame or a scene. The first lens unit 170 may include one or more lenses controlled to widen or narrow a shoot range of modulated signal.

The reflected signal included in incident light may be inputted to the receiver 120 through the second lens unit 180. According to an embodiment, the second lens unit 180 may integrate the reflected signal and transfer the reflected signal to the receiver 120. Like the first lens unit 170, the second lens unit 180 may include one or more lens. Not shown in FIG. 3, the TOF sensing system 100A may include a lens controller configured to control motorized photographic lens functions such as zoom, focus, and iris opening (aperture). The lens controller may control the second lens unit 180 including the one or more lenses. In addition, the second lens unit 180 may include at least one filter between a lens for removing some signals or lights not relevant to the reflected signal from the incident light. For example, though the incident light may have various wavelengths, the at least one filter could pass the reflected signal having a specific wavelength corresponding to the modulated signal.

The receiver 120 may include a pixel array 126. The pixel array 126 may include a plurality of pixels, each capable of receiving the reflected signal and generating pixel information PI (e.g., an amount of charge) or a signal corresponding to the reflected signal. The plurality of pixels may be arranged in a form of array. The pixel array 126 disposed in the receiver 120 may be controlled by the modulator 150 to output a plurality of pixel information PI (e.g., an amount of charge) or a plurality of signals to the signal converter 160.

The modulation period signal FC outputted from the modulation controller 142 in the modulation unit 140 may include information regarding the modulation signal outputted through the first lens unit 170. The modulation period signal FC may be inputted to the demodulator 150. The demodulator 150 may output a driving control signal TC for controlling the receiver 120 based on the modulation period signal FC. The demodulator 150 may determine different phases of the driving control signal TC, which correspond to a phase of the modulation period signal FC. According to an embodiment, the demodulator 150 may include a phase signal generator 152 and a driver 154. The phase signal generator 152 may output phase information signals PFC such as 0 degrees and 180 degrees. In another embodiment, the phase signal generator 152 in the demodulator 150 may output phase information signals PFC such as 90 degrees, 180 degrees, 270 degrees and/or 360 degrees to the driver 154. In response to the phase information signals PFC determined by the phase signal generator 152, the driver 154 may output the driving control signal TC to the receiver 120. Here, the receiver 120 may include the pixel array 126. The reflected signals collected by the receiver 120 may be determined by the phase converter 152 and the driver 154 in the demodulator 150, which will be described in detail later with reference to FIGS. 6 and 7. Because the demodulator 150 recognizes characteristics of the modulated signal through the modulation period signal FC, the demodulator 150 can control or drive the receiver 120 through a phase shift to measure or collect the reflected signals.

The receiver 120 may be controlled based on the drive control signal TC outputted from the modulator 150. The demodulator 150 may generate the drive control signal TC, in response to the modulation period signal FC used for controlling the emitter 110. The phase signal generator 152 in the demodulator 150 may output the phase information signals PFC which are corresponding to the modulation period signal FC, and the driver 154 may drive the receiver 120 based on the modulation phase signals PFC. The driver 154 may generate the driving control signal TC. Here, the modulation phase signals PFC may include plural signals having a preset phase difference such as 180° or 90° from each other. The driver 154 may output the driving control signal TC for driving the plurality of pixels in the pixel array 126 included in the receiver 120, in response to the modulation phase signals PFC.

The plurality of pixel information PI (e.g., an amount of charge) or the plurality of signals outputted from the receiver 120 may be converted into plural pieces of digital data through the signal converter 160. For example, the plurality of pixel information PI (e.g., an amount of charge) or the plurality of signals outputted from the receiver 120 controlled by the demodulator 150 may be a type of analog data, and the signal converter 160 may convert the pixel information PI into the plural pieces of digital data DD. The data DD converted by the signal converter 160 can be transferred to the signal processor 130.

The signal processor 130 may calculate or estimate a distance between the TOF sensing system 100A and the target 20 through a calculation process based on the pieces of data transmitted from the signal converter 160. An operation of the signal processor 130 will be described later with reference to FIGS. 6 to 7. In addition, the depth information regarding an object included in a scene or a specific area may be calculated based on the estimated distance calculated by the signal processor 130. For example, when a distance between the TOF sensing system 100A and a first position of the target 20 is 3 m, and another distance between the TOF sensing system 100A and a second position of the target 20 is 3.5 m. In this case, the TOF sensing system 100A can recognize that depth information between the first position and the second position can be 50 cm. An image generated by a camera including the TOF sensing system 100A can show the target 20 in three dimensions based on the depth information.

Figure 4:
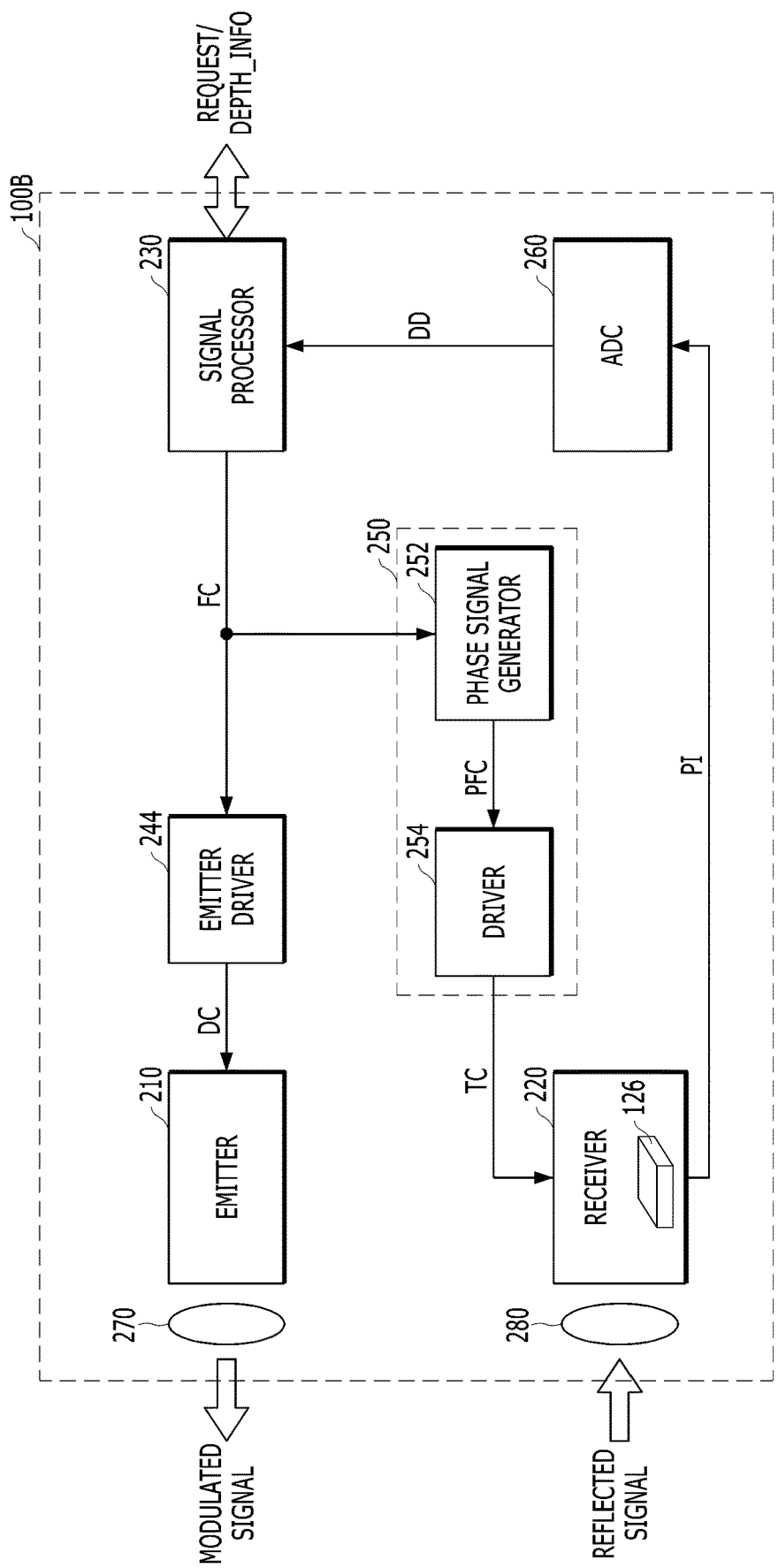
FIG. 4 illustrates a second example of a TOF sensing system according to an embodiment of the disclosure.

FIG. 4 illustrates a second example of a TOF sensing system 100 according to an embodiment of the disclosure. As compared with the first example of the time-of-flight sensing system described with reference to FIG. 3, the TOF sensing system 100 shown in FIG. 4 can be simplified structurally so that the second example could be easily applicable to small electronics such as a mobile phone, a camera and the like.

Referring to FIG. 4, a TOF sensing system 100B can include an emitter 210, a receiver 220, an emitter driver 244, a demodulator 250, a signal processor 230, a signal converter 260, a first lens unit 270 and a second lens unit 280. According to an embodiment, the demodulator 250 may include a phase shifter 252 and a driver 254.

A configuration (e.g., components) of the TOF sensing system 100B described with reference to FIG. 4 might be similar to that of the TOF sensing system 100A described with reference to FIG. 3. By way of example but not limitation, the emitters 210, 110, the receivers 220, 120, the demodulators 150, 250, the first lens units 270, 170 and the second lens units 280, 180 may perform similar functions or play similar roles. Herein, a detailed description may be focused on a difference therebetween.

The signal processor 230 may receive a request for obtaining or measuring a distance (depth information) from another device or a user interface which is interoperable with the TOF sensing system 1006. In response to the request, the signal processor 230 may output data about the estimated or calculated distance to another device or the user interface. After receiving the request for obtaining the distance or the depth information, the signal processor 230 may output a modulation period signal FC having a preset modulation frequency to the emitter driver 244. The emitter driver 244 may output an emitting control signal DC in response to the modulation period signal FC outputted from the signal processor 230.

In addition, the modulation period signal FC having the modulation frequency outputted from the signal processor 230 may be inputted to the demodulator 250. The demodulator 250 may output a driving control signal TC for controlling the receiver 220 in response to the modulation period signal FC. The demodulator 250 may determine different phases corresponding to the modulation period signal FC. For example, the phase signal generator 252 in the demodulator 250 may output phase information PFC such as 90 degrees, 180 degrees, 270 degrees, or 360 degrees to the driver 254. In response to the phase information PFC determined by the phase signal generator 252, the driver 254 may transmit the driving control signal TC to the receiver 220. Here, the receiver 220 may include a pixel array 126. Herein, the driving control signal TC may include plural signals having different phases. The reflected signals collected by the receiver 220 controlled by the phase signal generator 252 and the driver 254 in the demodulator 250 will be described with reference to FIGS. 6 and 7.

Because the demodulator 250 recognizes the characteristics of the modulated signal through the modulation period signal FC, the demodulator 250 may drive the receiver 220 through a phase shift to measure or collect the reflected signal. Herein, the phase shift may include a process for receiving incident light via plural paths switched by signals having different phases.

The receiver 220 may output pixel information PI, after measuring, collecting, or determining the reflected signal in response to the driving control signal TC transmitted from the demodulator 250. The pixel information PI may be inputted to the signal converter 260. The signal converter 260 may output the digital data DD to the signal processor 230. The signal processor 230 may calculate or obtain distance information based on the digital data DD. A detailed operation of the signal processor 230 will be described later with reference to FIGS. 6 and 7.

According to an embodiment, the TOF sensing systems 100A, 100B can include various types of circuitry, circuits and algorithms which may be configured to generate the modulated signal outputted from the emitters 110, 210 as well as the driving control signal TC used for driving the pixel array 126 included in the receivers 120, 220. The driving control signal TC may be associated with the modulated signal.

The TOF sensing systems 100A, 100B described with reference to FIGS. 3 and 4 may be distinguishable from each other. The modulation controller 142 may be included in the TOF sensing system 100A, but not included in the TOF sensing system 1006. According to an embodiment, the modulation controller 142 may perform an operation for reducing a diversity of the modulation signal and an error of the modulation signal outputted through the emitter 110. Consistency of the modulation signal could be critical to collect a phase of the reflected signal. In the TOF sensing system 100A, the modulation controller 142 may be involved in generating plural types, plural characteristics or plural shapes of the modulation signal, so that depth/distance information may be easily performed even in various environments by using the modulation signal. For example, when it is determined that an error is severe in obtaining depth/distance information in a specific environment, the signal processor 130 may generate the modulation control signal MC to the modulation controller 142 so that the modulation controller 142 can output at least one of the modulation period signals FC having a different shape or a different frequency to improve accuracy of depth information in various environments.

Figure 5:
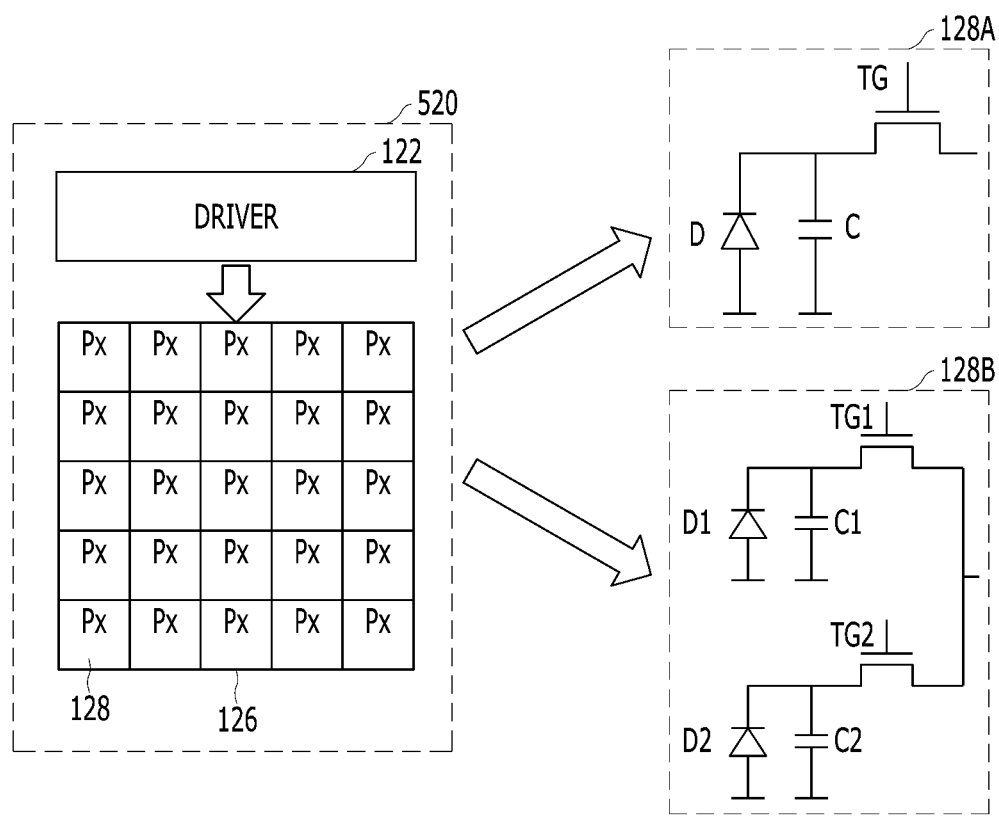
FIG. 5 shows an example of pixels included in an image sensor equipped with a TOF sensing system according to an embodiment of the disclosure.

FIG. 5 shows an example of pixels included in an image sensor equipped with a TOF sensing system 100 according to an embodiment of the disclosure.

Referring to FIG. 5, an image sensor 520 may include a pixel array 126 including a plurality of pixels 128 and a driver 122 for driving the pixel array 126. In the pixel array 126, a plurality of pixels 128 may be arranged according to a plurality of rows and a plurality of columns.

According to an embodiment, each of the plurality of pixels 128 may be implemented differently. In a first example, a pixel 128A may include a single light receiving element such as a photodiode D and a single transfer gate TG. In a second example, a pixel 128B may include two light receiving elements such as photodiodes D1, D2 and two transfer gates TG1, TG2.

In the second example, the pixel 128B may include two nodes or two taps. Each of two light receiving elements in each pixel can individually generate an amount of photo-charge corresponding to an incident light such as the reflected signal shown in FIGS. 1 to 4. But, the two transfer gates TG1, TG2 may be controlled by driving control signals having opposite phases. Because each of two light receiving elements can generate an amount of photo-charge while the reflected signal is received, the amount of photo-charge generated in each pixel might be larger than that generated in each pixel having a single light receiving element if the light receiving elements has a same flat size. However, the two transfer gates TG1, TG2 can alternatively output the amount of photo-charge because the driving control signals have the opposite phases, so that it may appear that each pixel can operate like two pixels working with a time lag. Accordingly, it may be avoided that a light reception area of each pixel might be reduced even though a size of pixel may be decreased. Further, a resolution of the image sensor may be improved.

Figure 6:
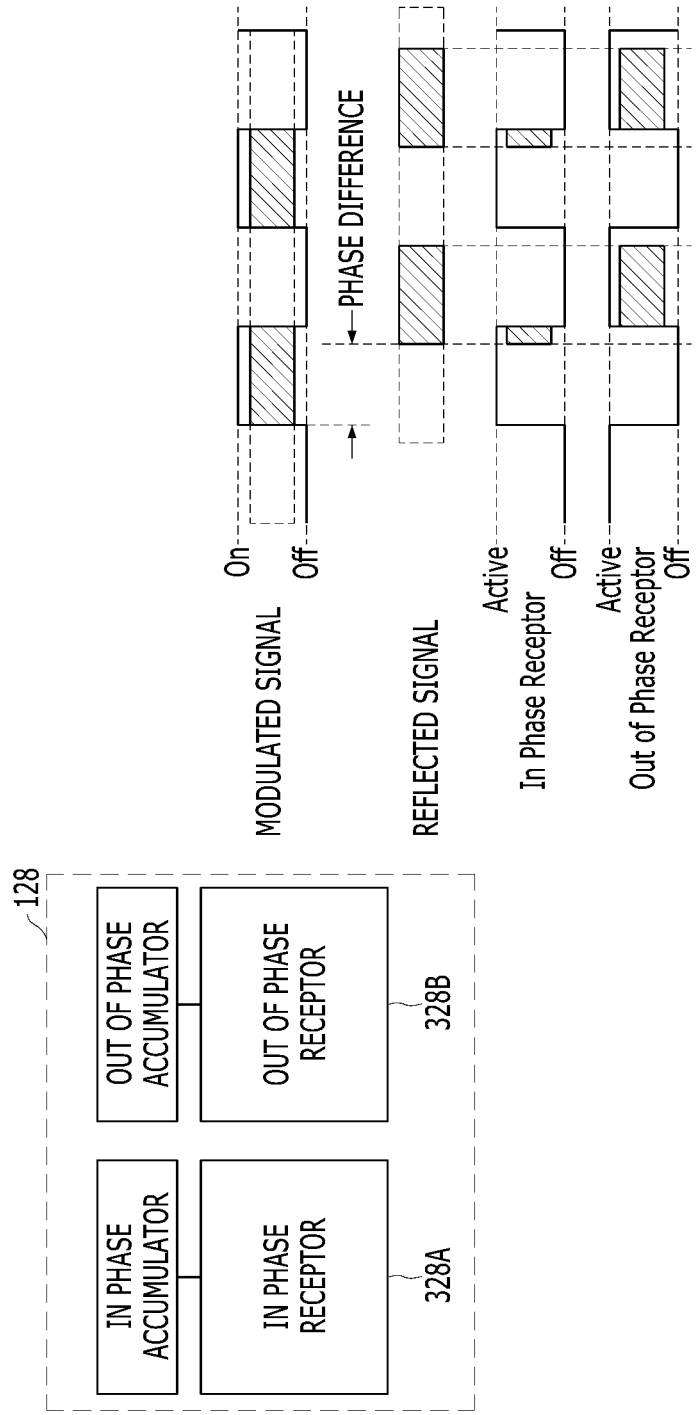
FIG. 6 illustrates an operation of an image sensor included in a TOF sensing system according to an embodiment of the disclosure.

FIG. 6 illustrates an operation of an image sensor 520 included in the TOF sensing system 100 according to an embodiment of the disclosure.

Referring to FIG. 6, a plurality of pixels 128 included in the image sensor 520 mounted in the TOF sensing system 100 may include a pair of receivers 328A and 328B. Referring to FIGS. 5 and 6, the pixel 128 may include a pair of receivers 328A and 328B. In another example, two adjacent pixels 128 may work together in a pair.

As shown in FIGS. 1 to 4, the modulated signal outputted from the TOF sensing system 100 may be inputted as the reflected signal after being reflected by the target 20.

A pair of receivers may include a first phase receiver 328A and a second phase receiver 328B. The first phase receiver 328A and the second phase receiver 328B may alternatively output the pixel information PI in different timings, i.e., different phases which are opposite to each other, in response to the reflected signal (e.g., incident light). The first phase receiver 328A may be referred as to an in-phase receptor, while the second phase receiver 328B may be referred as to an out-of-phase receptor.

According to an embodiment, the modulated signal may include an active section where the emitters 110, 210 are turned on and an inactivate section where the emitters 110, 210 are turned off. The active section may correspond to a half period of the modulated signal and the inactive section may correspond to the other half period of the modulated signal. Herein, the active section and the inactive section may have the same amount of time. The modulated signal may fly at the target 20 and then be reflected from the target 20 as the reflected signal, which is recognized by the receivers 120, 220. Herein, the reflected signal and the modulated signal can have the same characteristics such as a period or a frequency. The reflected signal received by the receivers 120, 220 and the modulated signal may have a phase difference representing a flight time or a flight distance between the TOF sensing system 100 and the target 20.

According to an embodiment, during a half period in which the emitters 110, 210 are turned on for outputting the modulated signal, the first phase receiver 328A is activated and the second phase receiver 328B is inactivated. During the other half period in which the emitters 110, 210 are turned off, the first phase receiver 328A is inactivated and the second phase receiver 3288 is activated.

When the reflected signal and the modulated signal have the phase difference as shown in FIG. 6, some of charge generated in response to the reflected signal may be outputted from the first phase receiver 328A, and the remaining part of the charge may be outputted from the second phase receiver 3288. Comparing the amounts of the charges, which are outputted through the first phase receiver 328A and the second phase receiver 3288, the TOF sensing system 100 can estimate or calculate the flight time or the flight distance between the TOF sensing system 100 and the target 20.

For example, although not shown, it is assumed that a distance traveled by the modulated signal is 0 m. In this case, the amount of charge generated in response to the reflected signal, which is outputted from the first phase receiver 328A, may be 100%, but the second phase receiver 3288 might output no charges, i.e., 0% amount of charge generated in response to the reflected signal.

A distance traveled by the modulated signal may be calculated based on a frequency (period) of the modulated signal and the speed of light. For example, when it is assumed that a frequency of the modulated signal is 1 Hz, the period of the modulated signal is 1 second. If an amount of charge generated in response to the reflected signal, which is outputted through the first phase receiver 328A, is 0% and the amount of charge generated in response to the reflected signal, which is outputted through the second phase receiver 3288, is 100%, it can be calculated that the modulated signal may be flown for 0.5 seconds. In this case, assuming that the time when the modulated signal is flying to the target and the time when the reflected signal is returned is the same, the distance between the TOF sensing system and the target is determined based on 0.25 seconds, which is a half of the entire flight time. The distance can be determined by multiplying 0.25 seconds and the speed of light.

Figure 7:
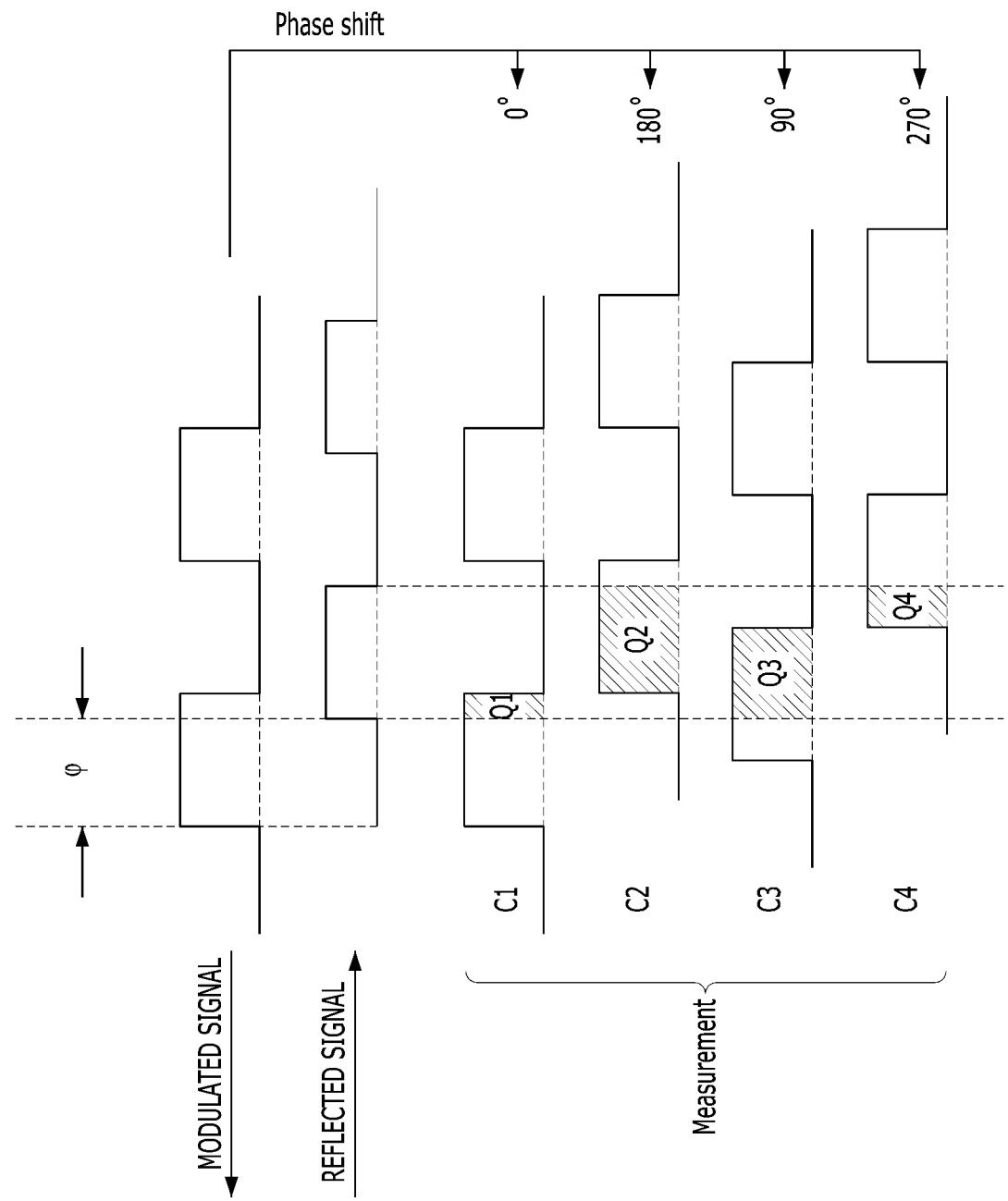
FIG. 7 describes a method of estimating a distance and a method of determining a magnitude of a modulated signal in a TOF sensing system according to an embodiment of the disclosure.

FIG. 7 describes a method of estimating a distance and a method of determining a magnitude of a modulated signal in the TOF sensing system 100 according to an embodiment of the disclosure. Referring to FIGS. 6 and 7, a method for calculating a distance and a method for determining a magnitude of the modulation signal may be a type of internal operations performed by the signal processors 130, 230 described with reference to FIGS. 3 and 4.

Referring to FIG. 7, there is a phase difference $\varphi$ between the modulated signal and the reflected signal. As described above with reference to FIGS. 1 to 4, the modulated signal outputted from the TOF sensing system 100 may be inputted as the reflected signal after reflected from the target 20.

Referring to FIGS. 3, 4 and 7, the modulated signal shown in FIG. 7 may be understood as a signal which is generated from the emitter 210 and outputted through the first lens unit 270. The reflected signal may be understood as a signal which is inputted to the receiver 220 through the second lens unit 280.

The time-of-flight sensing system 100 can shift a phase of a modulated signal. For example, phase shifts of 0°, 90°, 180° and 270° may be performed and are generated by the demodulators 150, 250. Referring to FIG. 6, a pair of 0° and 180° and/or another pair of 90° and 270° may be used in the receivers 120, 220. The phases used in the receivers 120, 220 are opposite to each other.

For example, phase-shifted signals C1, C2, C3, C4 used for recognizing the reflected signal in FIG. 7 can be considered as the driving control signal TC which is outputted from the demodulators 150, 250 and inputted to the receivers 120, 220, as described with reference to FIGS. 3 and 4.

An amount of charge is generated in response to the reflected signal such as the incident light. The light receiving element such as a photodiode in each pixel can generate an amount of charge based on the incident light, but each pixel may be controlled the phase-shifted signals C1, C2, C3, C4. Accordingly, each pixel 128 may output pixel information Q1, Q2, Q3, Q4 depending on the amount of charge and the phase-shifted signals C1, C2, C3 and C4 which correspond to the phase shifts of 0°, 180°, 90°, 270°. For example, the first pixel information Q1 may be outputted from a pixel 128 controlled by the first phase-shifted signal C1, and the second pixel information Q2 may be outputted from another pixel 128 controlled by the second phase-shifted signal C2. In an embodiment where a pixel 128 has a two-tap scheme, the first pixel information Q1 and the second pixel information Q2 can be outputted from the same pixel 128, but through different transfer gates which may be individually controlled by driving signals having an opposite phase. In another embodiment where a pixel 128 has a single photodiode and a single transfer gate, the first pixel information Q1 and the second pixel information Q2 may be individually outputted from adjacent pixels 128 which may be individually controlled by driving signals having an opposite phase. The amount of charge generated by the light receiving element(s) may be split and outputted as the pixel information Q1, Q2, Q3, Q4. For example, plural pieces of pixel information Q1, Q2, Q3, Q4 corresponding to the reflected signal shown in FIG. 7 may be understood as the pixel information PI outputted from the receivers 120, 220 described with reference to FIGS. 3 and 4.

Based on this, the phase difference $\varphi$ calculated by the signal processors 130, 230 described with reference to FIGS. 3 and 4 may be determined by the following equation.

$$\varphi = \tan^{-1}\left(\frac{Q4 - Q3}{Q1 - Q2}\right)$$

When the phase difference $\varphi$ is determined, the distance may be calculated according to the speed of light (e.g., light constant c) and a frequency f mod of the modulated signal.

$$\text{Distance} = \frac{c}{2 f_{mod}} \times \frac{\varphi}{2\pi}$$

In addition, an amplitude of the modulated signal may be estimated based on the pixel information Q1, Q2, Q3, Q4.

$$\text{Amplitude} = \sqrt{(Q1-Q2)^2 + (Q4-Q3)^2}$$

Through the above-described way, the TOF sensing system 100 may determine a frequency or an amplitude of the modulated signal and calculate a distance between the TOF sensing system 100 and the target 20. According to an embodiment, the frequency or the amplitude of the modulated signal may be changed according to an environment of the TOF sensing system 100.

On the other hand, in the operation of the TOF sensing system 100, as an amount of charge generated in response to the reflected signal may be outputted accurately based on each of the phase-shifted signals associated with the modulated signal, a distance error may be reduced and a resolution of depth information can be increased.

As described in FIG. 1, there are the modulated signal and the reflected signal, as well as the natural light or the ambient light in a circumstance where the TOF sensing system 100 works. For example, the modulated signal used in the TOF sensing system 100 may have a frequency band in an ultraviolet or infrared region. The modulated signal may also have the same frequency with any natural light or an optical signal in the circumstance. Even though the second lens units 180, 280 may have a filter, the natural light or the ambient light having a corresponding frequency band in an ultraviolet or infrared region can be inputted to the TOF sensing system 100. The natural light or the ambient light may act as a noise and an interference. Therefore, when the TOF sensing system 100 may be used outdoors during a day, the receivers 120, 220 may receive too much incident light due to the natural light or the ambient light. If too much incident light is inputted to the receiver, the TOF sensing system 100 may not have a margin for calculating or estimating a distance to a target or depth information of the target.

Figure 8:
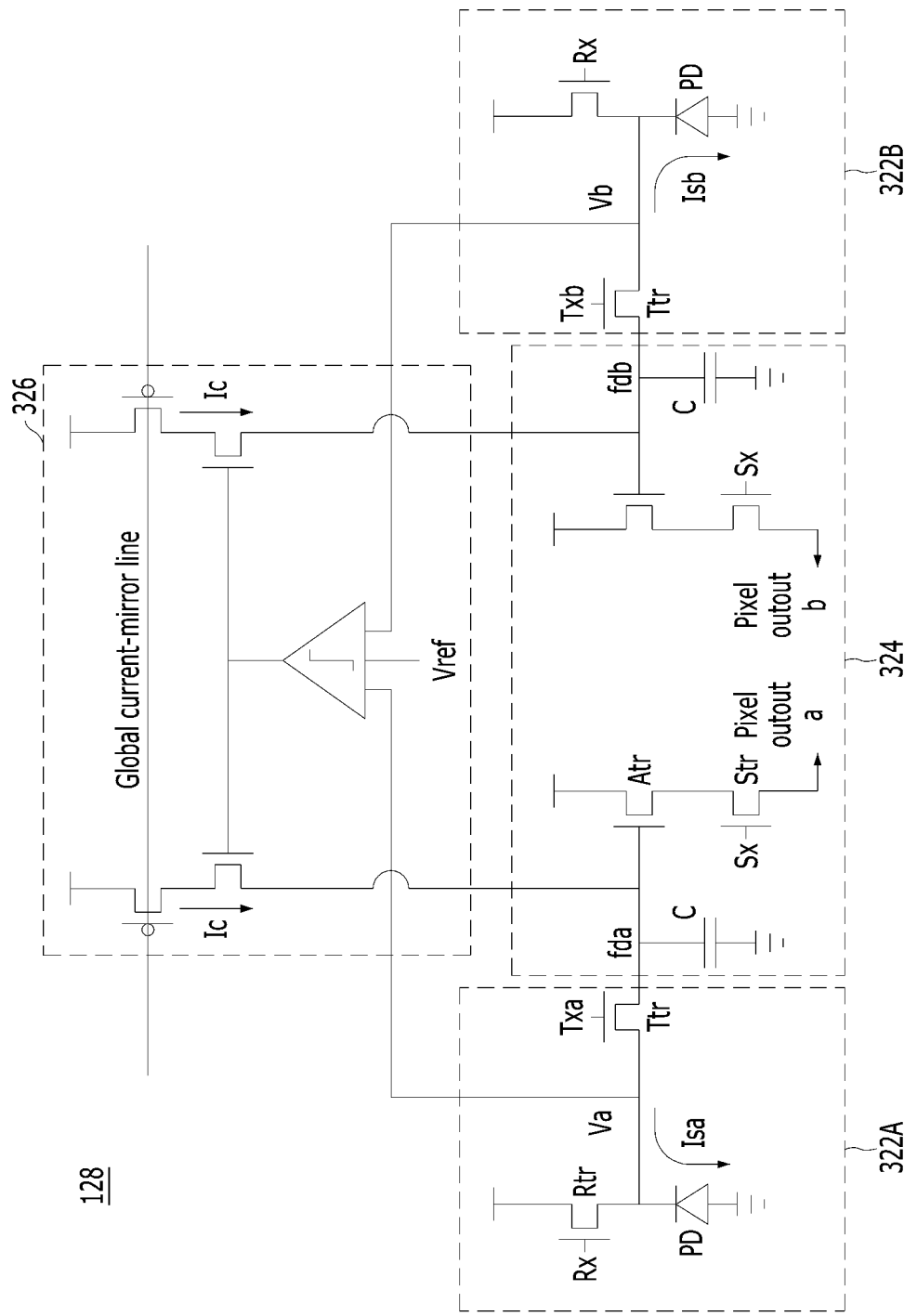
FIG. 8 illustrates a circuit diagram of a pixel structure of an image sensor included in a TOF sensing system according to an embodiment of the disclosure.

FIG. 8 illustrates a structure of the pixel 128 within the image sensor 520 included in the TOF sensing system 128 according to an embodiment of the disclosure.

Referring to FIG. 8, the pixel 128 in the image sensor may include a plurality of light receiving elements PD. Referring to FIGS. 5 and 6, each pixel 128 of the image sensor 520 may include two photo diodes, or two adjacent pixels 128 which may operate in a pair. In FIG. 8, an example in which the single pixel 128 includes two photo diodes is described.

According to an embodiment, the pixel 128 of the image sensor 520 may work, or be driven according to a current-assisted photonic demodulation (CAPD) method. The CAPD method drives the pixel 128 at high speed by using a drift current in the pixel 128 to increase reading accuracy of the reflected light. While a depletion layer corresponding to generated charge (e.g., electron-hole pair) can be formed in a pixel of a conventional image sensor, a pixel according to the CAPD method may operate at a high speed through a phenomenon in which charge generated by the photo diode moves rapidly due to a drift electric field formed by a drift current generated by an electric potential difference between two electrodes.

Referring to FIG. 8, the pixel 128 of the image sensor 520 according to an embodiment of disclosure may include two light receiving circuitry 322A, 322B and a pixel data output circuitry 324. The two light receiving circuitry 322A, 322B may have the same structure, and the pixel data output circuitry 324 may include two output terminals having the same structure and individually corresponding to the two light receiving circuitry 322A, 322B.

The first light receiving circuitry 322A may include a photo diode PD, a reset gate Rtr and a transfer gate Ttr. The reset gate Rtr may reset, in response to a reset signal Rx, a potential Va which depends on a charge generated by a photo diode PD. The transfer gate Ttr may output, in response to a first modulation signal Txa, the potential Va as a pixel voltage fda.

The pixel data output circuitry 324 connected to the first light receiving circuitry 322A may include a capacitor C for maintaining the pixel voltage fda, an access gate Atr and a select gate Str. A degree of turn-on of the access gate Atr is determined according to the pixel voltage fda. In response to a pixel selection signal Sx, the select gate Str may output, as the pixel information PI, a voltage transferred from the access gate Atr.

According to an embodiment, FIG. 8 illustrates a pixel 128 including four transistors or gates corresponding to a single photo diode PD. In another embodiment, the pixel 128 may include at least one photo diode and three transistors or gates corresponding to each photo diode.

The second light receiving circuitry 322B may have the same structure as the first light receiving circuitry 322A. The pixel data output unit 324 connected to the second light receiving circuitry 322B may include a capacitor C and a gate (or transistor) which are electrically connected to the first light receiving circuitry 322A. According to an embodiment, referring to FIGS. 6 to 7, a first driving control signal Txa and a second driving control signal Txb may have the opposite phases to individually drive the transfer gate Ttr in the first light receiving circuitry 322A and the transfer gate Ttr in the second light receiving circuitry 322B.

According to an embodiment, the pixel 128 in the image sensor 520 may include calibration circuitry 326. The calibration circuitry 326 may be configured to adjust plural pixel voltages fda, fdb outputted from the first light receiving circuitry 322A and the second light receiving circuitry 322B by a same level, when at least one of the potentials Va, Vb reaches a reference voltage Vref. The potentials Va, Vb may be determined based on an amount of charge generated by the photo diodes. For example, when the potential Va determined based on an amount of charge generated in the first light receiving circuitry 322A reaches the reference Vref, the calibration circuitry 326 coupled to the pixel data output circuitry 324 may shift (e.g., increase or decrease) the pixel voltages fda, fdb corresponding to the amount of charge generated by the first light receiving circuitry 322A and the second light receiving circuitry 322B by the same level or amount. Referring to FIGS. 6 and 7, in order to calculate or estimate a distance or depth information regarding the target in the TOF sensing system 100, it is important to detect a difference between the amounts of charge generated by two pixels 128 or two light receiving circuitries which are working in a pair. Therefore, the calibration circuitry 326 may adjust the plural pixel voltages fda, fdb by a same preset level, when any electric potential Va or Vb individually determined based on an amount of charge generated by the plurality of light receiving circuitry or photo diodes reaches the reference Vref, so as to avoid saturation of the pixel information PI. Accordingly, the TOF sensing system 100 may obtain an operation margin for calculating or estimating a distance or depth information about the target.

Figure 9:
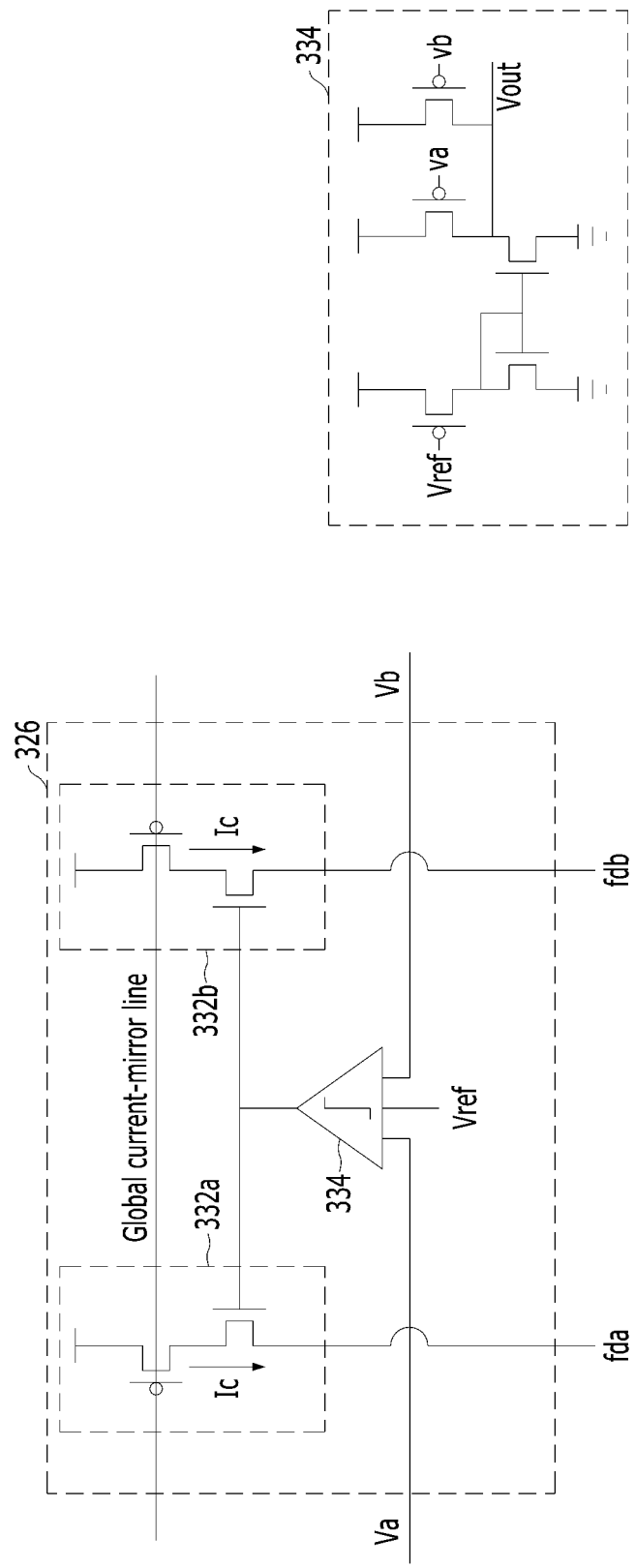
FIG. 9 illustrates calibration circuitry coupled to a pixel of the image sensor described with reference to FIG. 8.

FIG. 9 illustrates the calibration circuitry 326 coupled to a pixel 128 of the image sensor 520 described with reference to FIG. 8.

Referring to FIG. 9, the calibration circuitry 326 may include a comparator 334 configured to compare the plural potentials Va, Vb with the reference Vref and plural current sources 332a, 332b configured to supply a current Ic. The plural potentials Va, Vb may be varied individually according to amounts of charge generated from plural photo diodes or plural light receiving circuitry. The current Ic may be used for adjusting the plural pixel voltages fda, fdb in response to an operation result of the comparator 334.

In FIG. 9, the comparator 334 may compare the reference Vref with two potentials Va, Vb determined based on the amounts of charge generated by two photo diodes, the first driving control signal Txa and the second driving control signal Txb. However, according to an embodiment, three or more potentials may be compared with the reference Vref. Referring to a configuration of the comparator 334, as the number of comparison targets increases, other potentials may be coupled in parallel to the potentials Va, Vb. Thus, the comparator 334 may compare the reference Vref with plural potentials outputted from plural pixels 128 in a row of the image sensor 520.

Furthermore, the plurality of current sources 332a, 332b may be connected to other current sources included in adjacent pixels 128 through a global current mirror line. An amount of the current Ic provided by the plurality of current sources 332a, 332b is predetermined. The same amount of the current Ic may be supplied to each pixel 128. In the image sensor 520, the global current mirror line may be connected to the calibration circuitry 326 included in each of a plurality of pixels 128 connected in a row.

According to an embodiment, the current Ic provided from the plurality of current sources 332a, 332b may be determined according to a level of power supply voltage applied to the image sensor 520, a pixel driving frequency, and the like. In addition, when the TOF sensing system 100 can change the pixel driving frequency according to an operation mode, the amount of the current Ic provided by the plurality of current sources 332a, 332b may be changed.

Referring to FIG. 9, the plurality of current sources 332a, 332b may include a first transistor having a gate connected to the global current mirror line and a second transistor having a gate receiving an operation result of the comparator 334. According to an embodiment, an internal configuration of the plurality of current sources 332a, 332b that may provide a preset amount of the current Ic may be changed.

On the other hand, in the calibration circuitry 326 of the plurality of pixels 128 included in the image sensor 520, the operation results of the comparator 334 may be the same or different. These results may indicate that a noise due to the natural light or the ambient light occurs in all or some portions in a scene (or an image frame) where the reflected signal is inputted to the image sensor 520. Even when the noise occurs in all or some areas where the image sensor 520 collects data regarding a distance or depth information, the comparison result of the calibration circuitry 326 may be used for removing the noise. In addition, because the calibration circuitry 326 does not affect a difference between the plural potentials individually determined based on an amount of charge generated from each light receiving element such as a photo diode, nor modify the difference, distortion of data regarding a distance or depth information outputted from the TOF sensing system 100 may be avoided.

Figure 10:
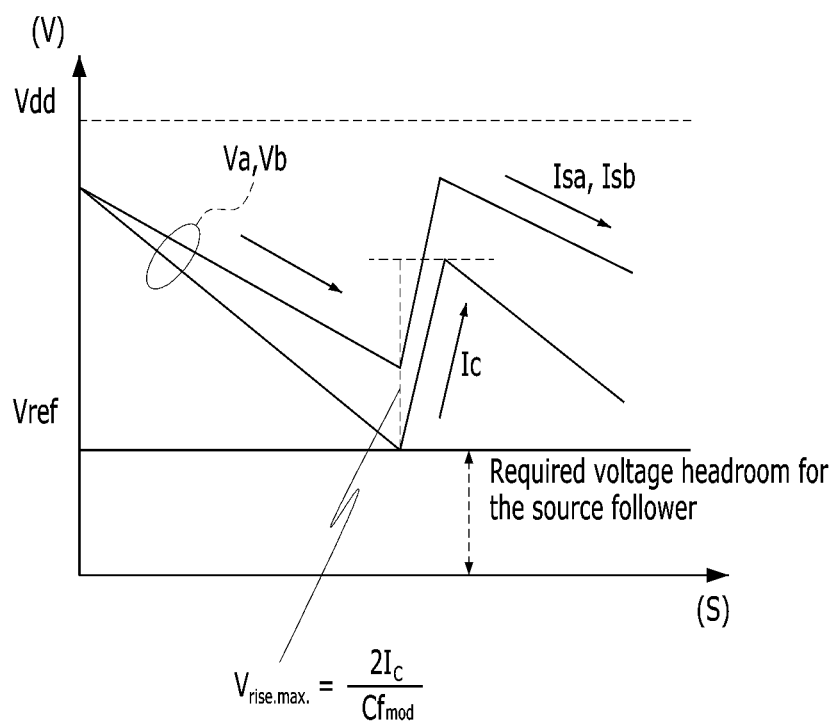
FIG. 10 shows an operation of the calibration circuitry shown in FIGS. 8 and 9.

FIG. 10 shows an operation of the calibration circuitry 326 shown in FIGS. 8 and 9.

Referring to FIG. 10, each pixel 128 in the image sensor 520 is supplied with a power supply voltage Vdd, and plurality of light receiving elements in the pixel 128 receive the reflected signal and the natural light (or the ambient light). Further, the natural light (or the ambient light) with the same phase and the same amount is constantly inputted to the plurality of light receiving elements.

The plurality of light receiving elements may generate an amount of charge corresponding to the reflected signal as well as the natural light (or the ambient light), and the potentials Va, Vb may be changed based on the amount of charge generated from each of the plurality of light receiving elements. Because the natural light (or the ambient light) is inputted with the same phase and the same amount to each of the plurality of light receiving elements, the amounts of charge generated from each of the plurality of light receiving elements in response to the natural light (or the ambient light) are substantially the same as each other. However, referring to FIGS. 6 and 7, the amounts of charge generated from the plurality of light receiving elements in response to the reflection signal may be different depending on a distance between the target 20 and the TOF sensing system 100. Therefore, when the image sensor 520 is driven, e.g., while each pixel 128 is activated, a difference may occur between the potentials Va, Vb determined based on the amounts of charge generated in the plural receiving elements.

As a difference between the potentials Va, Vb determined based on the amounts of charge increases, a resolution and a precision with respect to a distance or depth information between the TOF sensing system 100 and the target may be higher. However, when the amounts of charge generated from the plurality of light receiving elements rapidly increase due to the natural light or the ambient light, the potentials Va, Vb determined based on the amounts of charge may also increase quickly. When one of the potentials Va, Vb goes beyond the reference value Vref, the TOF sensing system 100 may no longer recognize a difference between the amount of charges generated from the plurality of light receiving elements in response to the reflected signal, so that a resolution and a precision regarding a distance between the target and the TOF sensing system 100 may be lowered or degraded.

Therefore, when one of the plural potentials Va, Vb (determined based on the amounts of charge) reaches the reference Vref, the calibration circuitry 326 can supply a current to adjust the plural pixel voltages fda, fdb by a preset level 'Vrise.max.' The preset level 'Vrise.max.' may be less than a difference between the power supply voltage Vdd and the reference Vref. The range in which the plural pixel voltages fda, fdb are increased by the calibration circuitry 326 may be calculated as shown in the equation.

$$V_{rise,max.} = \frac{2I_c}{Cf_{mod}}$$

Herein, the current Ic is an amount of the current supplied by the calibration circuitry 326, f mod is a pixel driving frequency, and C is the speed of light. The pixel driving frequency f mod may be a frequency of the first and second modulation signals Txa, Txb used for controlling the transfer gate Ttr in the pixel 128.

On the other hand, the reference Vref may have a value less than the power supply voltage Vdd and greater than zero. The greater a difference between the supply voltage Vdd and the reference Vref is, the higher a resolution and precision of the TOF sensing system 100 becomes. However, the reference Vref may be determined corresponding to the configuration of the pixel data output circuitry 324 including transistors in the pixel 128 of the image sensor

520. For example, the reference Vref may be greater than a voltage headroom for a source follower in the pixel 128 of the image sensor 520.

The calibration circuitry 326 may supply a current to the pixel 128 when one of the plural potentials Va, Vb determined based on the amounts of charge reaches the reference Vref, so as to adjust the plural pixel voltages fda, fdb by a preset level 'Vrise.max.' This level transition of the plural pixel voltages fda, fdb may be repeatedly performed while the TOF sensing system 100 may obtain a distance or depth information once. While or after the plural pixel voltages fda, fdb are transitioned by the preset level 'Vrise.max,' the difference between the amounts of charges generated from the plurality of light receiving elements in response to the reflected signal may be gradually increased. The difference between the currents Isa, Isb flowing from the plurality of light receiving elements PD included in the first light receiving circuitry 322A and the second light receiving circuitry 322B may be greater. As a result, a difference between the plural pixel voltages fda, fdb outputted from the first light receiving circuitry 322A and the second light receiving circuitry 322B may be further increased so that resolution and precision of depth information can be increased.

Figure 11:
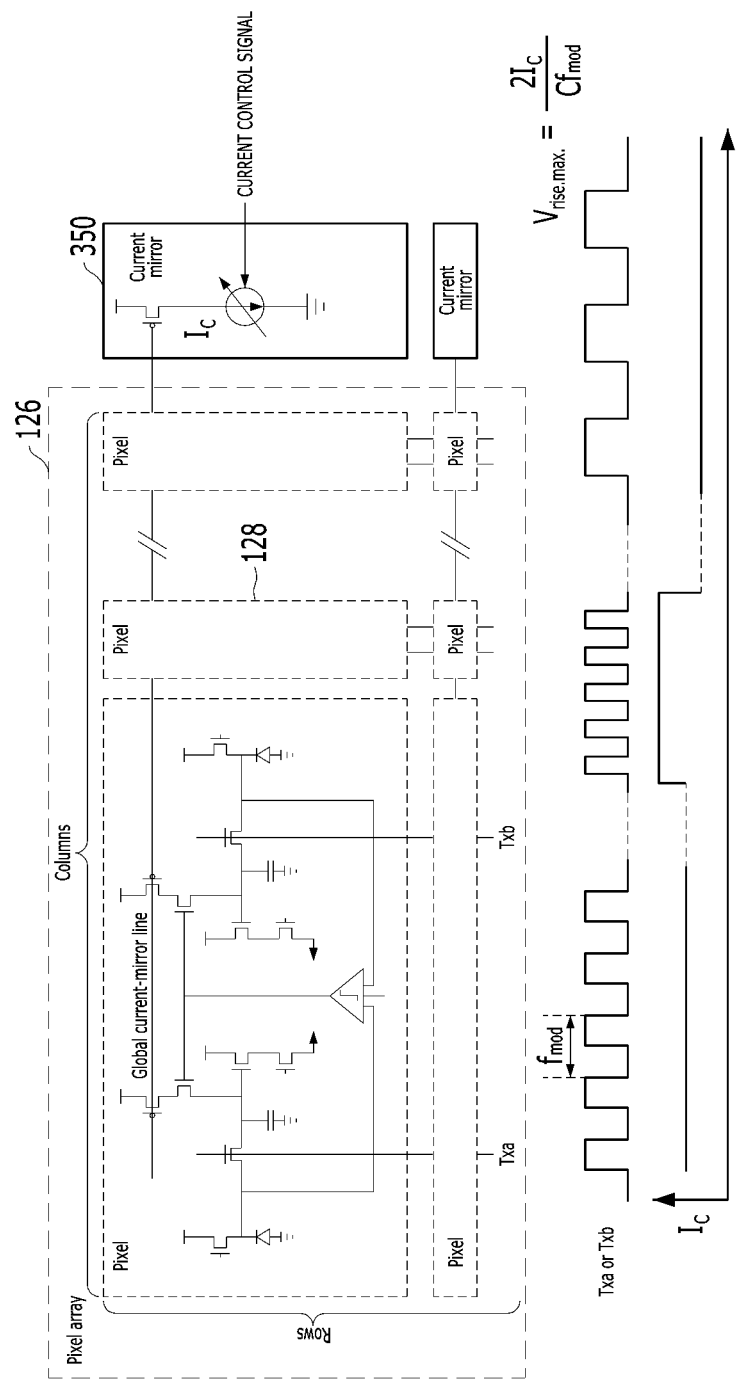
FIG. 11 illustrates a current supply of an image sensor included in a TOF sensing system according to an embodiment of the disclosure.

FIG. 11 illustrates a current supply of the image sensor 520 included in the TOF sensing system 100 according to an embodiment of the disclosure.

Referring to FIG. 11, the pixel array 126 in the image sensor 520 may include the plurality of pixels 128 arranged along a plurality of rows and a plurality of columns. A current supply circuit 350 is disposed in each of the plurality of rows. The current supply circuitry 350 may control an amount of the current Ic which the calibration circuitry 326 can supply to each pixel 128 through the global current mirror line. The current supply circuitry 350 may determine the amount of the current Ic in response to a current control signal.

According to an embodiment, the current control signal may be implemented with a plurality of bits corresponding to the number of pixel driving frequencies used in the TOF sensing system 100. The receiver in the TOF sensing system 100 may work differently depending on which pixel driving frequency is used. The TOF sensing system 100 can measure or calculate a distance more precisely based on a pixel driving frequency selected for a specific situation or circumstance. That is, the pixel driving frequency can be varied to obtain a more precise distance between the TOF sensing system 100 and the target 20. If the pixel drive frequency f mod is varied for more precise distance measurement, the amount of the current Ic which is supplied through the calibration circuit can also be changed.

According to an embodiment of the disclosure, a TOF sensing system 100 may reduce or avoid influence of interference, disturbance, or noise present in an environment, thereby generating a three-dimensional image showing accurate depth information of an object.

In addition, an embodiment of the disclosure can provide an apparatus configured to output a 3D image including depth information of object or target in a scene, which is determined based on relative values of light reflected from the object or the target, even if a frequency domain of a modulated signal which is used by a TOF sensing system 100 is included in a frequency domain of natural light that is commonly present in an environment.

While the invention has been illustrated and described with respect to specific embodiments, it will be apparent to those skilled in the art in light of the disclosure that various changes and modifications may be made without departing from the spirit and scope of the disclosure as defined in the following claims. The invention encompasses all changes and modifications that fall within the scope of the claims.

What is claimed is:

1. An image sensor employed in a time-of-flight (TOF) sensing system, comprising:
    a pixel array including plural pixels, each pixel including at least one photo diode and each pixel generating an amount of charge corresponding to an incident light;
    comparing circuitry configured to compare voltage levels, each voltage level individually changed based on the amount of charge outputted from each pixel, with a reference voltage to output a comparison result;
    calibration circuitry configured to adjust the voltage levels equally based on the comparison result; and
    current supply circuitry configured to determine an amount of current supplied by the calibration circuitry in response to a current control signal, wherein the current supply circuitry and the calibration circuitry work as a current mirror.

2. The image sensor according to claim 1, wherein the calibration circuitry is configured to maintain a difference between the voltage levels when adjusting the voltage levels by a predetermined amount.

3. The image sensor according to claim 1, wherein the calibration circuitry is further configured to supply a preset amount of current into the pixel array.

4. The image sensor according to claim 1, wherein the pixel comprises:
    a reset gate coupled to the at least one photo diode and configured to reset the amount of charge in response to a reset signal;
    a transfer gate configured to output a pixel voltage based on the amount of charge in response to a modulation signal;
    an access gate configured to be turned on in response to the pixel voltage transferred from the transfer gate; and
    a select gate configured to selectively output a voltage outputted from the access gate in response to a selection signal.

5. The image sensor according to claim 4, wherein the calibration circuitry is further configured to:
    check a potential, varied based on the amount of charge, between the transfer gate and the at least one photo diode; and
    adjust the pixel voltage between the transfer gate and the access gate.

6. The image sensor according to claim 1, wherein the calibration circuitry includes a current source configured to supply a current to the pixel array for adjusting the voltage levels.

7. The image sensor according to claim 6, wherein the current resource comprises:
    a switching transistor coupled to each pixel and turned on in response to the comparison result; and
    a variable resistor coupled to a power supply and configured to determine an amount of the current.

8. The image sensor according to claim 1,
    wherein the plural pixels are arranged along a plurality of rows and a plurality of columns, and
    wherein the calibration circuitry controls pixels row by row.

9. The image sensor according to claim 1,
    wherein the calibration circuitry is configured to increase the voltage levels by a predetermined amount, and wherein the predetermined amount is proportional to the amount of current and inversely proportional to a driving frequency of each pixel.

10. A time-of-flight (TOF) sensing system, comprising:
an emitter configured to output a modulated signal having a preset phase;
a receiver including an image sensor configured to receive a reflected signal which is reflected from a target; and
signal processing circuitry configured to determine a distance from the target based on a phase relationship between the modulated light and the reflected light,
wherein the image sensor comprises:
    a pixel array including plural pixels, each pixel including at least one photo diode and each pixel generating an amount of charge corresponding to the reflected light;
    comparing circuitry configured to compare voltage levels, each voltage level individually changed based on the amount of charge outputted from each pixel, with a reference voltage to output a comparison result;
    calibration circuitry configured to adjust the voltage levels equally based on the comparison result; and
    current supply circuitry configured to determine an amount of current supplied by the calibration circuitry in response to a current control signal, wherein the current supply circuitry and the calibration circuitry work as a current mirror.

11. The TOF sensing system according to claim 10, wherein the calibration circuitry is configured to maintain a difference between the voltage levels when adjusting the voltage levels by a predetermined amount.

12. The TOF sensing system according to claim 10, wherein the calibration circuitry is further configured to supply a preset amount of current into the pixel array.

13. The TOF sensing system according to claim 10, wherein the pixel comprises:
    a reset gate coupled to the at least one photo diode and configured to reset the amount of charge in response to a reset signal;
    a transfer gate configured to output a pixel voltage based on the amount of charge in response to a modulation signal;
    an access gate configured to be turned on in response to the pixel voltage transferred from the transfer gate; and
    a select gate configured to selectively output a voltage outputted from the access gate in response to a selection signal.

14. The TOF sensing system according to claim 13, wherein the calibration circuitry is further configured to:
    check a potential, varied based on the amount of charge, between the transfer gate and the at least one photo diode; and
    adjust the pixel voltage between the transfer gate and the access gate.

15. The TOF sensing system according to claim 10, wherein the calibration circuitry includes a current source configured to supply a current to the pixel array for adjusting the voltage levels.

16. The TOF sensing system according to claim 15, wherein the current resource comprises:
    a switching transistor coupled to each pixel and turned on in response to the comparison result; and
    a variable resistor coupled to a power supply and configured to determine an amount of the current.

17. The TOF sensing system according to claim 10,
wherein the plural pixels are arranged along a plurality of rows and a plurality of columns, and
wherein the calibration circuitry controls pixels row by row.

18. The TOF sensing system according to claim 10,
wherein the calibration circuitry is configured to increase the voltage levels by a predetermined amount, and
wherein the predetermined amount is proportional to the amount of current and inversely proportional to a driving frequency of each pixel.

* * * * *